United States Patent
Igata et al.

(10) Patent No.: US 11,580,594 B2
(45) Date of Patent: Feb. 14, 2023

(54) INFORMATION PROCESSING DEVICE, INFORMATION PROCESSING METHOD, AND INFORMATION PROCESSING SYSTEM

(71) Applicant: TOYOTA JIDOSHA KABUSHIKI KAISHA, Toyota (JP)

(72) Inventors: Hiroshi Igata, Yokohama (JP); Shin Sakurada, Toyota (JP); Kuniaki Jinnai, Nagoya (JP); Motoyoshi Hatta, Anjo (JP); Shota Hirose, Toyoake (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/209,389

(22) Filed: Dec. 4, 2018

(65) Prior Publication Data
US 2019/0172127 A1 Jun. 6, 2019

(51) Int. Cl.
*G06Q 30/06* (2012.01)
*G07C 5/00* (2006.01)
*G07B 15/02* (2011.01)
*G06Q 30/02* (2012.01)
*G06Q 30/0645* (2023.01)
*G06Q 30/0283* (2023.01)

(52) U.S. Cl.
CPC ..... *G06Q 30/0645* (2013.01); *G06Q 30/0284* (2013.01); *G07B 15/02* (2013.01); *G07C 5/008* (2013.01)

(58) Field of Classification Search
None
See application file for complete search history.

(56) References Cited

U.S. PATENT DOCUMENTS

| 10,026,237 | B1* | 7/2018 | Fields | G07C 5/02 |
| 2009/0027056 | A1* | 1/2009 | Huang | G01R 31/389 |
| | | | | 324/439 |
| 2014/0358459 | A1* | 12/2014 | Trnka | G01R 31/389 |
| | | | | 702/63 |

(Continued)

FOREIGN PATENT DOCUMENTS

| CN | 107330756 A | * 11/2017 |
| JP | 2002288784 A | 10/2002 |

(Continued)

OTHER PUBLICATIONS

J. Ostermann, T. Renner, F. Koetter and S. Hudert, "Leveraging Electric Cross-Company Car Fleets through Cloud Service Chains: The Shared E-Fleet Architecture," 2014, 2014 Annual SRII Global Conference, pp. 290-297 (Year: 2014).*

(Continued)

*Primary Examiner* — Sarah M Monfeldt
*Assistant Examiner* — Michael J. Monaghan
(74) *Attorney, Agent, or Firm* — Hunton Andrews Kurth LLP (57) ABSTRACT

A management server is configured to perform a process including: a step of obtaining a utilization history of each user in the previous month when a condition for performing a dividing ratio setting process is satisfied; a step of updating a utilization record evaluation; a step of calculating a first dividing ratio; a step of updating a driving record evaluation; a step of calculating a second dividing ratio; and a step of setting a dividing ratio.

4 Claims, 6 Drawing Sheets

(56) References Cited

U.S. PATENT DOCUMENTS

| | | | | |
|---|---|---|---|---|
| 2015/0206229 A1* | 7/2015 | Kang | ............... | G06Q 30/08 |
| | | | | 705/26.3 |
| 2015/0348058 A1* | 12/2015 | Liu | ............... | G06Q 30/0201 |
| | | | | 705/14.49 |
| 2017/0103101 A1* | 4/2017 | Mason | ............... | G07C 5/008 |
| 2017/0146354 A1* | 5/2017 | Boss | ............... | G01C 21/3438 |
| 2018/0080995 A1* | 3/2018 | Heinen | ............... | B60L 58/16 |

FOREIGN PATENT DOCUMENTS

| | | | | | |
|---|---|---|---|---|---|
| JP | 2005295670 | A | | 10/2005 | |
| JP | 2012-243228 | A | | 12/2012 | |
| JP | 2013084199 | A | * | 5/2013 | |
| JP | 2018077733 | A | * | 5/2018 | ............ G06Q 30/06 |

OTHER PUBLICATIONS

G. Bianchessi, C. Ongini, G. Alli, E. Panigati and S. Savaresi, "Vehicle-sharing: Technological infrastructure, vehicles, and user-side devices—Technological review," 2013, 16th International IEEE Conference on Intelligent Transportation Systems (ITSC 2013), pp. 1599-1604 (Year: 2013).*

Damianos Gavalas, Charalampos Konstantopoulos, and Grammati Pantziou. "Design and management of vehicle-sharing systems: a survey of algorithmic approaches." 2016, Smart cities and homes (2016), pp. 261-289 (Year: 2016).*

[Press Release] Condominium × Sharing of Travel Trailer = Proposal of Japan's First Urban Outdoor Life, DigOut, Inc., [online], Feb. 17, 2016, Searched on Apr. 27, 2021, the Internet <URL: http://digout.co.jp/news/160217.html>.

* cited by examiner

| USER ID OF RESIDENT GROUP | UTILIZATION RECORD EVALUATION | DRIVING RECORD EVALUATION | DIVIDING RATIO (%) |
|---|---|---|---|
| 001 | 4 | 3 | 37.2 |
| 002 | 3 | 2 | 26.7 |
| 003 | 2 | 5 | 36.1 |

INFORMATION PROCESSING DEVICE, INFORMATION PROCESSING METHOD, AND INFORMATION PROCESSING SYSTEM

This nonprovisional application is based on Japanese Patent Application No. 2017-234415 filed on Dec. 6, 2017, with the Japan Patent Office, the entire contents of which are hereby incorporated by reference.

BACKGROUND

Field

The present disclosure relates to a setting of a dividing ratio for dividing a profit obtained by renting an electric vehicle owned by a plurality of persons to another person.

Description of the Background Art

Conventionally, a rental system has been known in which an electric vehicle is rented to a user and a rental fee is collected therefrom. As one form of such a rental system, for example, in Japanese Patent Laying-Open No. 2012-243228, the following configuration has been known: a vehicle managed together by a plurality of users who belong to a predetermined group is rented to each of the users who belong to the predetermined group, and a fee is set for the user in accordance with utilization period and traveling distance of the user.

SUMMARY

However, in the above rental system, for example, when the vehicle is rented to a user who does not belong to the predetermined group and the rental fee is collected therefrom, a problem arises in how a profit obtained by way of the rental fee is passed on to the plurality of users who belong to the predetermined group. In the above-described patent publication, such a problem is not taken into consideration at all because it is premised that only the users who belong to the predetermined group utilize the electric vehicle.

An object of the present disclosure is to provide an information processing device, an information processing method, and an information processing system, by each of which a profit obtained by renting, to another person, an electric vehicle owned by a plurality of users who belong to a predetermined group is appropriately passed on to the plurality of users.

An information processing device according to a certain aspect of the present disclosure includes: a storage configured to store (i) information for specifying a plurality of users who belong to a predetermined group and who share an electric vehicle, and (ii) a utilization history of each of the plurality of users for the electric vehicle; and a setting device configured to set, using the utilization history, a dividing ratio for dividing, for each of the plurality of users, a profit obtained by renting the electric vehicle to a user who does not belong to the predetermined group.

In this way, for the plurality of users who belong to the predetermined group, the dividing ratio is set using the utilization history of each of the plurality of users, whereby the profit obtained by renting to the user who does not belong to the predetermined group can be passed on to the plurality of users at an appropriate dividing ratio.

In a certain embodiment, the utilization history includes a utilization period during which the electric vehicle is utilized. The setting device is configured to set a different dividing ratio when the utilization period is different among the plurality of users.

In this way, when the utilization period is different among the plurality of users, the different dividing ratio is set, whereby the profit can be divided fairly among the users.

In a certain embodiment, the utilization history includes a deterioration utilization period involving a utilization state in which a power storage device mounted in the electric vehicle is deteriorated. Among the plurality of users, the setting device is configured to set, for a user for whom the deterioration utilization period is long, the dividing ratio to be lower than the dividing ratio set for a user for whom the deterioration utilization period is short.

In this way, among the plurality of users, the dividing ratio lower than the dividing ratio for the user for whom the deterioration utilization period is short is set for the user for whom the deterioration utilization period is long. Hence, the profit can be divided fairly among the users.

An information processing method according to another aspect of the present disclosure includes: storing (i) information for specifying a plurality of users who belong to a predetermined group and who share an electric vehicle, and (ii) a utilization history of each of the plurality of users for the electric vehicle; and setting, using the utilization history, a dividing ratio for dividing, for each of the plurality of users, a profit obtained by renting the electric vehicle to a user who does not belong to the predetermined group.

An information processing system according to still another aspect of the present disclosure includes: an electric vehicle shared by a plurality of users, the plurality of users belonging to a predetermined group; and a server. The server is configured to: store (i) information for specifying the plurality of users and (ii) a utilization history of each of the plurality of users for the electric vehicle; and set, using the utilization history, a dividing ratio for dividing, for each of the plurality of users, a profit obtained by renting the electric vehicle to a user who does not belong to the predetermined group.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The following describes embodiments of the present disclosure with reference to figures in detail. It should be noted that the same or corresponding portions in the figures are given the same reference characters and are not described repeatedly.

<As to Configuration of Information Processing System>

Figure 1:
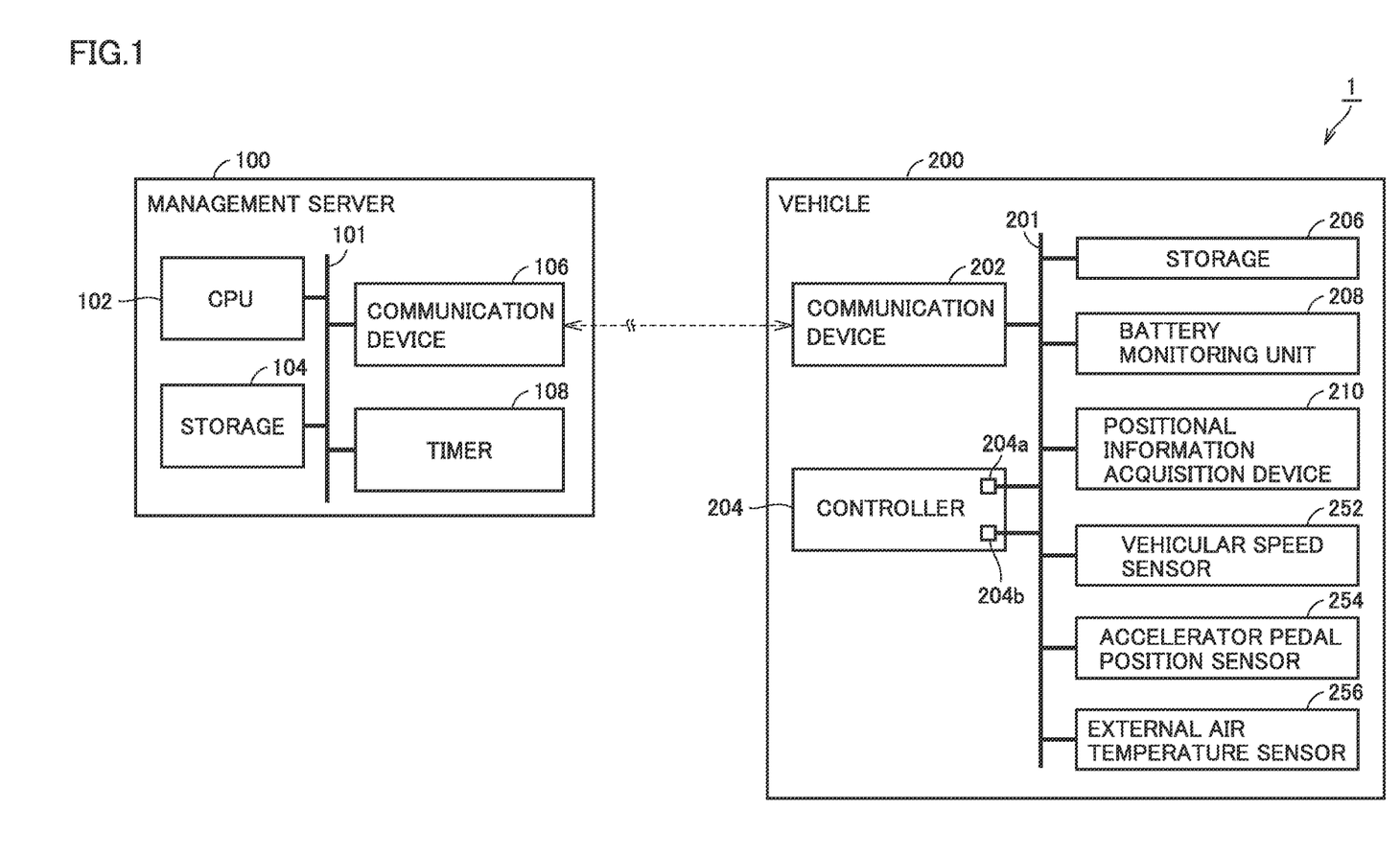
FIG. 1 is an overall configuration diagram of an information processing system according to the present embodiment.

FIG. 1 is an overall configuration diagram of an information processing system 1 according to the present embodiment. As shown in FIG. 1, information processing system 1 according to the present embodiment includes a management server 100, and a vehicle 200 that is an electric vehicle.

Management server 100 includes a CPU (Central Processing Unit) 102, a storage 104, a communication device 106, and a timer 108. Each component is communicatively connected by a communication bus 101.

CPU 102 is configured to execute prescribed computation processing based for example on information stored in storage 104, information received from vehicle 200 via communication device 106, and/or the like.

Storage 104 includes, for example, a memory such as a ROM (Read Only Memory) and a RAM (Random Access Memory), and a large-capacity storage device such as a hard disk or a solid state drive. Storage 104 stores a utilization history for vehicle 200, for example.

Communication device 106 is configured to communicate with a communication device 202 of vehicle 200, for example. For example, communication device 106 and communication device 202 communicate information with each other through wireless communication. Communication device 106 and communication device 202 may communicate via a relay point (a wireless base station) or a predetermined communication network (for example, the Internet), or may not communicate via a relay point or a predetermined communication network.

The wireless communications may be done in a wireless communication system capable of transmitting and receiving signals via a relay point utilizing a wireless LAN (Local Area Network) represented by IEEE 802.11, a wireless communication standard for a mobile phone such as 2G, 3G, 4G, 5G, etc., and the like, or may be done in a wireless communication system capable of transmitting and receiving signals directly between communication device 106 and communication device 202 and for example utilizing a wireless communication standard such as Bluetooth (Registered trademark) or the like.

Timer 108 counts the current date and time. For example, CPU 102 stores in storage 104 a result of counting time by timer 108. When reading the current date and time from storage 104, CPU 102 may correct the current date and time by an externally received digital signal (standard radio wave) including date information and time information.

Vehicle 200 includes communication device 202, a controller 204, a storage 206, a battery monitoring unit 208, a positional information acquisition device 210, a vehicular speed sensor 252, an accelerator pedal position sensor 254, and an external air temperature sensor 256. Each component is communicatively connected by a communication bus 201.

Communication device 202 is configured to communicate with communication device 106 of management server 100, for example. Communication device 106 and communication device 202 wirelessly communicate as has been described above, and accordingly, how they do so will not be described redundantly.

Controller 204 includes, for example, a CPU 204a, a memory 204b (ROM and RAM), an input/output port for inputting and outputting various signals (not shown) and so forth. Controller 204 is configured to execute prescribed computation processing based on the information stored in memory 204b and storage 206, information received from management server 100 via communication device 202, and the like.

Storage 206 is a storage device that can store data of a larger size than memory 204b, and is, for example, a storage device composed of a nonvolatile memory, a hard disk, a solid state drive, or the like. Storage 206 stores, for example, an external air temperature history, vehicle 200's driving history (for example, positional information history (i.e., a traveling route), a vehicular speed history, and an accelerator pedal position history), an SOC (state of charge) history of a battery 214 (see FIG. 2) mounted in vehicle 200, and battery 214's voltage, current, and temperature histories, and the like.

Battery monitoring unit 208 detects a state of battery 214 mounted in vehicle 200. Battery monitoring unit 208 detects, for example, battery 214's voltage, current and temperature. Battery monitoring unit 208 calculates an estimated value of the SOC of battery 214 by using for example the detected voltage, current and temperature of battery 214. The SOC may be estimated using a well-known technique, and it will not be described specifically. Note that the SOC may be estimated by controller 204 rather than battery monitoring unit 208.

Positional information acquisition device 210 is configured to obtain the current position of vehicle 200. For example, positional information acquisition device 210 may obtain the current position of vehicle 200 by using GPS (Global Positioning System), or may obtain the current position of vehicle 200 by using positional information of a wireless communication device located outside vehicle 200 and capable of communicating with communication device 202. Positional information acquisition device 210 transmits to controller 204 a signal indicating the current position of vehicle 200 as obtained.

Vehicular speed sensor 252 senses the speed of vehicle 200. Vehicular speed sensor 252 transmits a signal indicating the sensed speed of vehicle 200 to controller 204.

Accelerator pedal position sensor 254 senses an amount of pressing an accelerator pedal (not shown) (hereinafter referred to as an accelerator pedal position). Accelerator pedal position sensor 254 transmits a signal indicating the sensed accelerator pedal position to controller 204.

External air temperature sensor 256 senses the temperature around vehicle 200 (hereinafter referred to as external air temperature). External air temperature sensor 256 transmits a signal indicating the sensed external air temperature to controller 204. Controller 204 causes storage 206 to store therein a variety of types of information based on the signals received from battery monitoring unit 208, positional information acquisition device 210, vehicular speed sensor 252, accelerator pedal position sensor 254, and external air temperature sensor 256.

Figure 2:
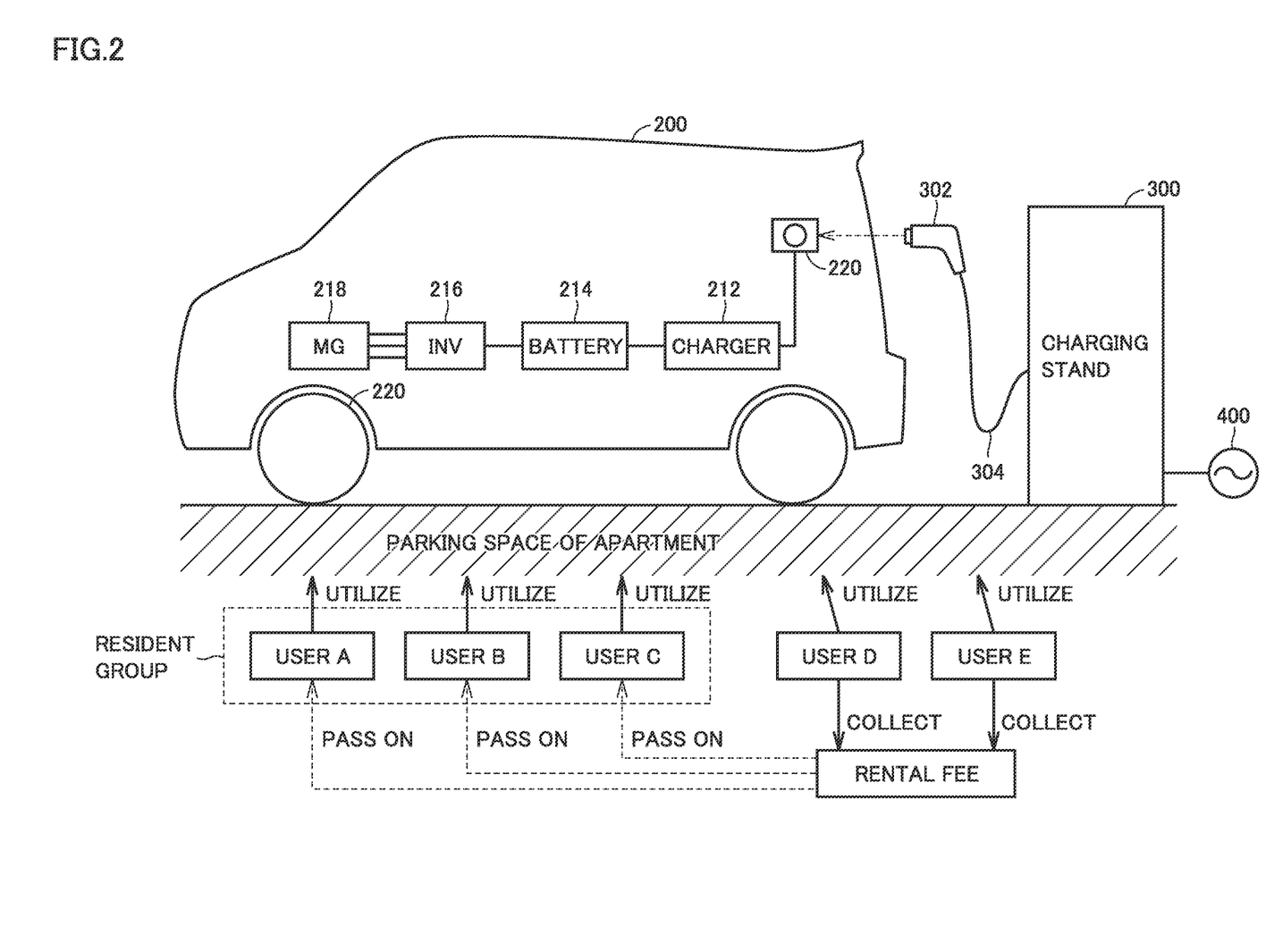
FIG. 2 is a diagram for illustrating a utilization manner of an electric vehicle in the present embodiment.

Vehicle 200 is an electric vehicle using an electric motor as a driving power source. In the present embodiment, vehicle 200 is owned and shared by a plurality of users who belongs to a predetermined group. The following describes a configuration of vehicle 200 that is an electric vehicle, as well as a utilization manner of vehicle 200. FIG. 2 is a diagram for illustrating the utilization manner of the electric vehicle.

As shown in FIG. 2, vehicle 200 further includes a charger 212, battery 214, an inverter 216, a motor generator 218, and an inlet 220.

When a charging connector 302 of a charging stand 300 is attached to inlet 220, charger 212 charges battery 214 with power supplied from an external power supply 400.

Battery 214 is configured using, for example, a secondary battery such as a nickel-metal hydride battery or a lithium ion battery. Battery 214 may be any power storage device capable of storing power, and for example, a large-capacity capacitor may be used instead of battery 214.

Inverter 216 is a power conversion device which converts power between AC power and DC power. Inverter 216 may for example convert DC power of battery 214 into AC power and supply it to motor generator 218. Further, inverter 216 may for example receive AC power (regenerative power) from motor generator 218, convert it into DC power, and supply it to battery 214 to electrically charge battery 214 therewith.

Motor generator 218 receives power supplied from inverter 216 and provides rotational force to a drive wheel 222. Drive wheel 222 is rotated by the rotational force provided by motor generator 218 to drive vehicle 200.

Inlet 220 is provided in vehicle 200 at an exterior portion of vehicle 200 together with a cover (not shown) such as a lid. Inlet 220 has a shape allowing charging connector 302 to be attached thereto. Inlet 220 and charging connector 302 both have contacts, respectively, incorporated therein, and when charging connector 302 is attached to inlet 220, the contacts come into contact with each other, and inlet 220 and charging connector 302 are thus electrically connected together.

Charging stand 300 is installed outside vehicle 200 and connected to charging connector 302 via a charging cable 304. Charging stand 300 is electrically connected to power supply 400, and when charging connector 302 is attached to inlet 220, the power of power supply 400 is supplied via charging stand 300, charging cable 304, and charging connector 302 to vehicle 200.

<As to Utilization Manner of Electric Vehicle>

In the present embodiment, as the utilization manner of the electric vehicle, for example, a utilization manner (sharing) is set in which the plurality of users who belong to the predetermined group shares vehicle 200 that is one electric vehicle. In such a utilization manner, each of the plurality of users who belong to the predetermined group can utilize vehicle 200 freely.

As shown in FIG. 2, in the present embodiment, for example, the following illustratively describes that: the predetermined group is a resident group constituted of residents of the same apartment; vehicle 200 is parked at a parking space of the apartment; and a user A, a user B, and a user C belong to the resident group. For example, each of the plurality of users who belong to the resident group makes a reservation for a scheduled utilization period in advance. In the case where vehicle 200 is utilized in the scheduled utilization period, the user pays a rental fee corresponding to the utilization, after the utilization. Renting and maintenance of vehicle 200 are managed by a business operator for the apartment, for example. The rental fee paid by each user is used for: expenses required for ownership and utilization of vehicle 200 (such as an electricity expense); and management-related expenses paid to the business operator for the apartment, such as a parking fee for the space to park vehicle 200.

In the case where vehicle 200 is utilized in such a utilization manner, it is considered to collect a rental fee by also renting vehicle 200 to a user (a user D or user E in FIG. 2) who does not belong to the resident group.

In this case, a problem arises in how a profit obtained by way of a rental fee collected from user D or user E who do not belong to the resident group is passed on to user A, user B, and user C of the resident group.

To address this, in the present embodiment, management server 100 is configured to use the utilization history for vehicle 200 to set a dividing ratio for dividing, for each of the plurality of users, the profit obtained by renting the electric vehicle to the user who does not belong to the predetermined group. For example, the utilization history for vehicle 200 includes: a period (hereinafter, referred to as "utilization period") of utilizing vehicle 200; and a period (hereinafter, referred to as "deterioration utilization period") involving a utilization state in which battery 214 mounted in vehicle 200 is deteriorated. It should be noted that in the present embodiment, management server 100 corresponds to an "information processing device". In the present embodiment, as the utilization history, at least the utilization period and deterioration utilization period in the previous month may be included.

In this way, the profit obtained by renting to the user who does not belong to the predetermined group can be passed on to the plurality of users at an appropriate dividing ratio.

<As to Setting of Dividing Ratio>

For example, whenever vehicle 200 is returned, management server 100 obtains the utilization period and deterioration utilization period elapsed from the time of renting. Management server 100 adds the obtained utilization period and deterioration utilization period to the previous value of the corresponding user, and stores the resulting value into storage 104. Whenever a predetermined period (for example, 1 month) passes, management server 100 uses the utilization period in the immediately previous month to update an evaluation value of a utilization record evaluation of each user in the previous month. Furthermore, management server 100 uses the deterioration utilization period in the immediately previous one month to update an evaluation value of a driving record evaluation of each user in the previous month. Management server 100 updates an evaluation list using the updated values. Moreover, management server 100 sets a dividing ratio for each of the plurality of users using the updated values. When the profit obtained by renting to the user who does not belong to the resident group in the previous month is confirmed, management server 100 sets a divided amount of the profit for each of the plurality of users in accordance with the set dividing ratio.

<As to Utilization Record Evaluation and Driving Record Evaluation>

Figure 3:
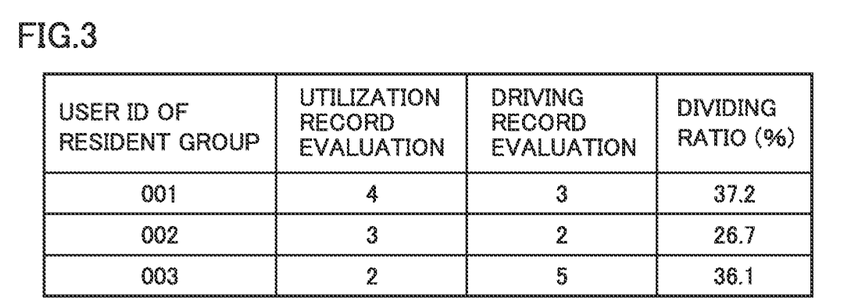
FIG. 3 is a diagram showing an exemplary evaluation list.

FIG. 3 is a diagram showing an exemplary evaluation list. As shown in FIG. 3, the evaluation list is associated with: information (user ID) for specifying the user of the resident group; the utilization record evaluation; the driving record evaluation; and the dividing ratio.

For example, user IDs "001" to "003" are user IDs for respectively specifying user A to user C who belong to the above-described resident group.

In the item of the utilization record evaluation, an evaluation value set in accordance with the utilization period of vehicle 200 in the previous month is indicated. Specifically, in the item of the utilization record evaluation, an evaluation value is set to indicate which one of five levels the utilization record evaluation corresponds to. It is indicated that as the evaluation value of the utilization record evaluation is higher, the evaluation is higher (that is, the evaluation is such that a higher dividing ratio can be set). In the utilization record evaluation, a higher value is set as the utilization period in the previous month is longer. For example, utilization periods are classified into five levels, i.e., evaluation values of 1 to 5, and an evaluation value is specified in accordance with which level the utilization period in the previous month corresponds to.

In the item of the driving record evaluation, an evaluation value set in accordance with the deterioration utilization period of vehicle 200 in the previous month is indicated. Specifically, in the item of the driving record evaluation, an evaluation value is set to indicate which one of five levels the driving record evaluation corresponds to. It is indicated that as the evaluation value of the driving record evaluation is higher, the evaluation is higher (that is, the evaluation is such that a higher dividing ratio can be set). In the driving record evaluation, a higher value is set as the deterioration utilization period in the previous month is shorter. For example, deterioration utilization periods are classified into five levels, i.e., evaluation values of 1 to 5, and an evaluation value is specified in accordance with which level the deterioration utilization period in the previous month corresponds to.

For example, management server 100 calculates the deterioration utilization period using a history of change in accelerator position during the utilization of vehicle 200. For example, management server 100 calculates, as the deterioration utilization period, a period during which the accelerator position becomes more than or equal to a threshold value during the utilization of the vehicle.

<As to Dividing Ratio Setting Process>

Figure 4:
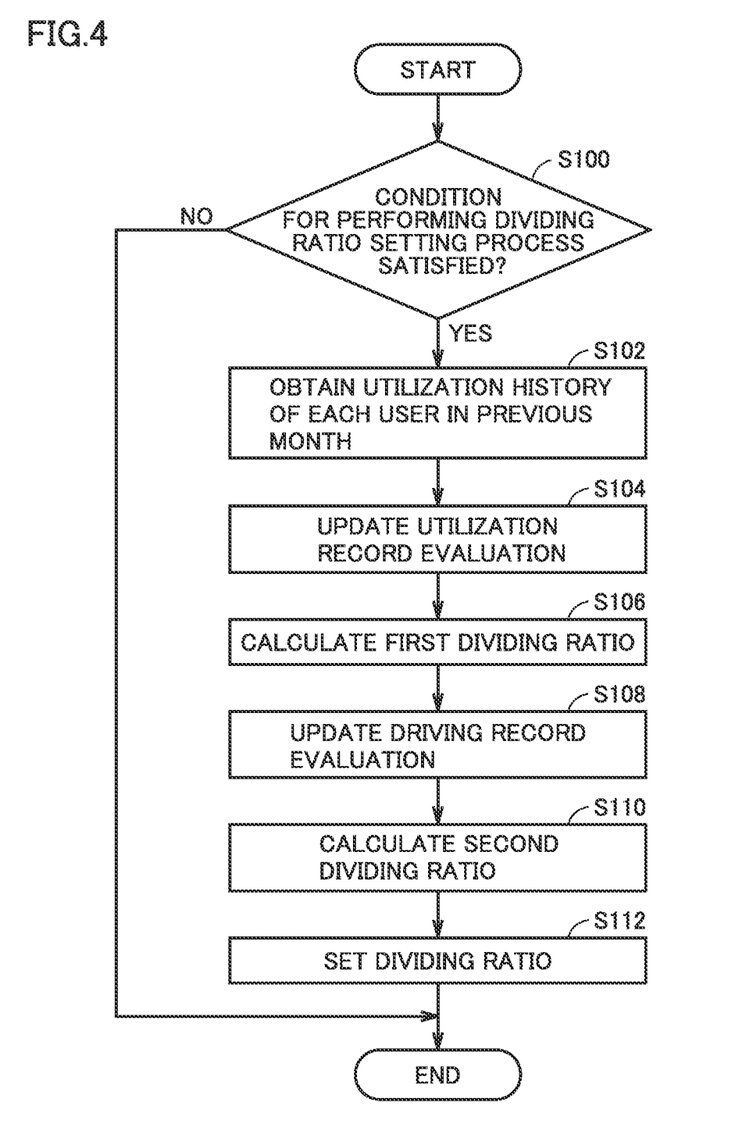
FIG. 4 is a flowchart showing a dividing ratio setting process.

Hereinafter, a dividing ratio setting process will be described in detail with reference to FIG. 4. FIG. 4 is a flowchart showing the dividing ratio setting process. In the present embodiment, the dividing ratio setting process will be described as being executed by management server 100 (more specifically, CPU 102 of management server 100) for the sake of illustration. While each step shown in the flowchart shown in FIG. 4 is implemented by software processing done by management server 100, a part thereof may be implemented by hardware (or electric circuitry) fabricated in management server 100.

In step (hereinafter, the term "step" will be abbreviated as "S") 100, management server 100 determines whether or not a condition for performing the dividing ratio setting process is satisfied. For example, management server 100 determines that the condition for performing the dividing ratio setting process is satisfied when a predetermined period (for example, one month) has elapsed since a time point at which the previous (previous month) dividing ratio setting process was performed or when the current date is the first date of a month. When it is determined that the condition for performing the dividing ratio setting process is satisfied (YES in S100), the process proceeds to S102.

In S102, management server 100 obtains the utilization history of each of the plurality of user A to user C, who belong to the resident group, in the previous month. Management server 100 obtains, from storage 104, the utilization history of each of user A to user C in the previous month.

In S104, management server 100 updates the utilization record evaluation of each of the plurality of user A to user C. The utilization record evaluation is mentioned above, and is not therefore described in detail repeatedly.

In S106, management server 100 calculates a first dividing ratio based on the utilization record evaluation. For example, management server 100 calculates, as the first dividing ratio, a ratio of the evaluation value of each user to a total of the evaluation values of the utilization record evaluations. Specifically, for example, management server 100 calculates the first dividing ratio in accordance with the following formula: the first dividing ratio=the evaluation value of the utilization record evaluation of the user/(the total of the evaluation values)×100(%).

For example, when the evaluation list is updated as shown in FIG. 3, the total of the evaluation values of the utilization record evaluations is 9 and the evaluation value of the utilization record evaluation of the user ID "001" is 4, so that management server 100 calculates the first dividing ratio for the user ID "001" to be about 44.4% in accordance with the following formula: the first dividing ratio=4/9×100(%).

In S108, management server 100 updates the driving record evaluation of each of the plurality of user A to user C. The driving record evaluation is mentioned above, and is not therefore described in detail repeatedly.

In S110, management server 100 calculates a second dividing ratio based on the driving record evaluation. For example, management server 100 calculates, as the second dividing ratio, a ratio of the evaluation value of each user to a total of the evaluation values of the driving record evaluations. Specifically, for example, management server 100 calculates the second dividing ratio in accordance with the following formula: the second dividing ratio=the evaluation value of the driving record evaluation of the user/(the total of the evaluation values)×100(%).

For example, when the evaluation list is updated as shown in FIG. 3, the total of the evaluation values of the driving record evaluations is 10 and the evaluation value of the driving record evaluation of the user ID "001" is 3, so that management server 100 calculates the second dividing ratio for the user ID "001" to be 30% in accordance with the following formula: the second dividing ratio=3/10×100(%).

In S112, management server 100 sets a final dividing ratio. Specifically, management server 100 sets, as the final dividing ratio for each user, an average value of the first dividing ratio and second dividing ratio for each user. For example, management server 100 sets, as the final dividing ratio, 37.2%, which is an average value of the first dividing ratio, 44.4%, and the second dividing ratio, 30%, of the user ID "001". It should be noted that management server 100 updates the evaluation list using the set dividing ratio as shown in FIG. 3.

<As to Operation of Management Server 100 Serving as Information Processing Device>

An operation of management server 100 which is an information processing device based on the above configuration and flowchart will now be described.

For example, when one month, which is the predetermined period, passes since the previous setting of the dividing ratio, management server 100 determines that the condition for performing the dividing ratio setting process has been satisfied (YES in S100), and obtains the utilization history of each user in the previous month (S102). Specifically, management server 100 obtains the utilization period and deterioration utilization period of each user from the utilization history for vehicle 200.

Management server 100 calculates a utilization period from the time of the previous setting of the dividing ratio to the current time, determines which one of the five levels the calculated utilization period corresponds to, and sets an evaluation value of the utilization record evaluation. Management server 100 updates the evaluation list using the evaluation value of the set utilization record evaluation (S104). Management server 100 calculates the first dividing ratio using the evaluation value of the updated utilization record evaluation (S106).

Further, management server 100 calculates a deterioration utilization period from the time of the previous setting of the dividing ratio to the current time, determines which one of the five levels the calculated deterioration utilization period corresponds to, and sets an evaluation value of the driving record evaluation. Management server 100 updates the evaluation list using the evaluation value of the set driving record evaluation (S108). Management server 100 calculates the second dividing ratio using the evaluation value of the updated driving record evaluation (S110).

Management server 100 sets the calculated average value of the first dividing ratio and the second dividing ratio as the final dividing ratio (S112). It should be noted that when the profit obtained in the previous month by renting vehicle 200 of the user who does not belong to the resident group is confirmed, management server 100 uses the set dividing ratio to calculate a divided amount of the profit for each of user A to user C who belong to the resident group.

<As to Function and Effect by Information Processing Device>

As described above, according to the information processing device according to the present embodiment, the profit is divided in accordance with the dividing ratio set for each of the plurality of users who belong to the resident group. Hence, the profit obtained by renting to the user who does not belong to the resident group can be appropriately passed on to the plurality of users. Accordingly, there can be provided an information processing device, an information processing method, and an information processing system, by each of which a profit obtained by renting an electric vehicle to a user who does not belong to a predetermined group can be passed on to each of a plurality of users.

Furthermore, when the utilization period is different among the plurality of users, a different dividing ratio is set. Hence, the profit can be fairly divided among the users.

Further, among the plurality of users, a dividing ratio lower than a dividing ratio for a user for whom the deterioration utilization period is short is set for a user for whom the deterioration utilization period is long. Hence, the profit can be divided fairly among the users.

<As to Modifications>

In the above-described embodiment, it has been described that the period during which the accelerator position becomes more than or equal to the threshold value is calculated as the deterioration utilization period; however, the deterioration utilization period is not particularly limited to the period during which the accelerator position becomes more than or equal to the threshold value. For example, a period during which an amount of change of the accelerator position becomes more than or equal to a threshold value may be calculated as the deterioration utilization period, a period during which the vehicular speed becomes more than or equal to a threshold value may be calculated as the deterioration utilization period, or a period during which an amount of change of vehicular speed becomes more than or equal to a threshold value may be calculated as the deterioration utilization period. Alternatively, a period during which an external temperature becomes more than or equal to a high-temperature threshold value may be calculated as the deterioration utilization period, or a period during which the external temperature becomes less than or equal to a low-temperature threshold value may be calculated as the deterioration utilization period. Alternatively, when an up-hill road is included in the traveling route, a period during which the vehicle is traveling on the up-hill road may be employed as the deterioration utilization period, or a period during which the magnitude of current flowing in battery 214 becomes more than or equal to a threshold value may be calculated as the deterioration utilization period.

Further, in the above-described embodiment, the utilization period and the deterioration utilization period have been illustratively described as the utilization history; however, for example, a traveling distance in the previous month may be employed as the utilization history to set the dividing ratio. For example, when a traveling distance in the previous month is different among the plurality of users, a different dividing ratio may be set. Alternatively, for example, the rental fee of the user who belongs to the resident group in the previous month may be employed as the utilization history to set the dividing ratio. For example, when a fee in the previous month is different among the plurality of users, a different dividing ratio may be set.

Further, in the above-described embodiment, it has been described that the average value of (i) the first dividing ratio calculated based on the evaluation value of the utilization record evaluation and (ii) the second dividing ratio calculated based on the evaluation value of the driving record evaluation is set as the final dividing ratio; however, for example, each of the first dividing ratio and the second dividing ratio may be multiplied by a predetermined weighting coefficient and a value obtained by adding the resulting values is set as the final dividing ratio. Alternatively, one of the first dividing ratio and the second dividing ratio may be set as the final dividing ratio.

Figure 5:
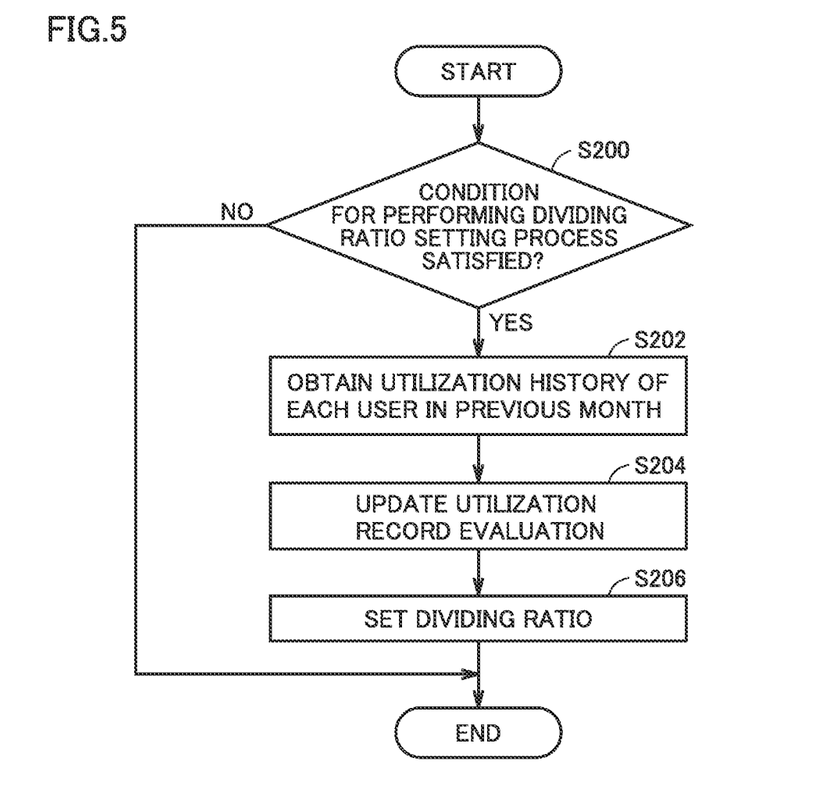
FIG. 5 is a flowchart showing a dividing ratio setting process in a first modification.

The following describes a dividing ratio setting process in a first modification with reference to FIG. 5. FIG. 5 is a flowchart showing the dividing ratio setting process in the first modification. Processes of S200, S202 and S204 shown in FIG. 5 are respectively the same as the processes of S100, S102 and S104 in FIG. 4. Accordingly, those processes are not repeatedly described in detail. In S206, management server 100 sets the first dividing ratio as the final dividing ratio. It should be noted that the method for calculating the first dividing ratio is mentioned above, and is therefore not described in detail repeatedly. In this way, when the utilization period is different among the plurality of users, a different dividing ratio is set, whereby the profit can be divided fairly among the users.

Figure 6:
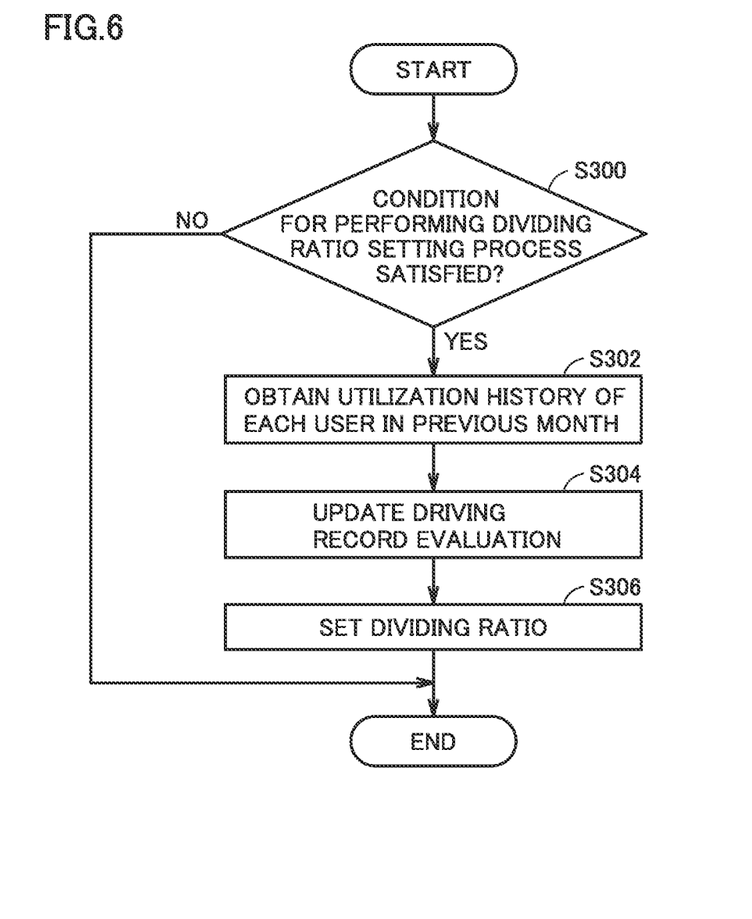
FIG. 6 is a flowchart showing a dividing ratio setting process in a second modification.

The following describes a dividing ratio setting process in a second modification with reference to FIG. 6. FIG. 6 is a flowchart showing the dividing ratio setting process in the second modification. Processes of S300, S302 and S304 shown in FIG. 6 are respectively the same as the processes of S100, S102 and S108 in FIG. 4. Accordingly, those processes are not repeatedly described in detail. In S306, management server 100 sets the second dividing ratio as the final dividing ratio. It should be noted that the method for calculating the second dividing ratio is mentioned above, and is therefore not described in detail repeatedly. In this way, among the plurality of users, a dividing ratio lower than a dividing ratio for a user for whom the deterioration utilization period is short is set for a user for whom the deterioration utilization period is long, whereby the profit can be divided fairly among the users.

Further, in the above-described embodiment, it has been described that the profit from the user who does not belong to the resident group is all passed on to each of the plurality of users who belong to the resident group; however, for example, part of the profit may be paid as a fee to the business operator (or administrator) for the apartment that manages the renting and maintenance of vehicle 200, and remainder of the profit may be divided in accordance with the set dividing ratio.

Further, in the above-described embodiment, it has been described that the dividing ratio is set using the utilization history in the previous month; however, for example, the dividing ratio may be set using a utilization history in past several months or several years until the current time, or each of the dividing ratio set using the utilization history in the previous month and the dividing ratio set using the utilization history in the past several months or several years may be multiplied by a predetermined weighting coefficient, and a value obtained by adding the resulting values may be set as the final dividing ratio.

Further, in the above-described embodiment, it has been described that each of the utilization record evaluation and the driving record evaluation has the five levels; however, evaluation values may be set as four or less levels or six or more levels. The highest level may be different between the utilization record evaluation and the driving record evaluation.

Further, in the above-described embodiment, when the evaluation value of the utilization record evaluation is set, the evaluation list is updated, and when the evaluation value of the driving record evaluation is set, the evaluation list is further updated; however, for example, the evaluation list may be updated when both the evaluation value of the utilization record evaluation and the evaluation value of the driving record evaluation are set.

Further, in the above-described embodiment, it has been described that the evaluation value of the utilization record evaluation is set to be higher as the utilization period is longer; however, the evaluation value of the utilization record evaluation may be set to be higher as the utilization period is shorter.

It should be noted that the above modifications may be implemented all together or may partially be implemented in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An information processing device comprising:
    a storage configured to store (i) information for specifying a plurality of users who belong to a predetermined group and who share an electric vehicle, and (ii) a utilization history of each of the plurality of users for the electric vehicle, the utilization history including a utilization period during which the electric vehicle is utilized and a deterioration utilization period in which a power storage device mounted in the electric vehicle is deteriorated;
    a controller configured to
        detect current of a battery mounted in the electric vehicle; and
        obtain current position of the electric vehicle, GPS obtains the current position of the vehicle;
    a speed sensor configured to sense speed of the electric vehicle;
    an accelerator pedal position sensor configured to sense an accelerator pedal position of the electric vehicle; and
    an air temperature sensor configured to sense external air temperature of the electric vehicle, wherein
    a communication device sends a request signal to the electric vehicle when the electric vehicle is returned;
    when the electric vehicle receives the request signal, the electric vehicle sends response information including at least one of a history of change in accelerator position during the utilization of the electric vehicle, a history of change in speed of the electric vehicle, a history of change in external air temperature of the electric vehicle, and a history of the positional information of the electric vehicle;
    the deterioration utilization period is determined when a period during which the accelerator pedal position of the electric vehicle becomes more than or equal to a threshold value, or a period during which an amount of change of the accelerator pedal position of the electric vehicle becomes more than or equal to a threshold value, or a period during which the speed of the electric vehicle becomes more than or equal to a threshold value, or a period during which an amount of change of the speed of the electric vehicle becomes more than or equal to a threshold value, or a period during which the external air temperature of the electric vehicle becomes more than or equal to a high-temperature threshold value, or a period during which the external air temperature of the electric vehicle becomes less than or equal to a low-temperature threshold value, or a period during which the electric vehicle is traveling on the up-hill road, or a period during which the current flowing in the battery becomes more than or equal to a threshold; and
    a central processing unit (CPU) configured to
    calculate the deterioration utilization period based on the response information;
    set, using the utilization history, a dividing ratio for dividing, for each of the plurality of users, a profit obtained by renting the electric vehicle to a user who does not belong to the predetermined group; and
    among the plurality of users, the CPU is further configured to set, for a user for whom the deterioration utilization period is long, the dividing ratio to be lower than the dividing ratio set for a user for whom the deterioration utilization period is short.

2. The information processing device according to claim 1, wherein
    the CPU is further configured to set a different dividing ratio when the utilization period is different among the plurality of users.

3. An information processing method comprising:
    storing (i) information for specifying a plurality of users who belong to a predetermined group and who share an electric vehicle, and (ii) a utilization history of each of the plurality of users for the electric vehicle, the utilization history including a utilization period during which the electric vehicle is utilized and a deterioration utilization period in which a power storage device mounted in the electric vehicle is deteriorated;
    detecting current of a battery mounted in the electric vehicle;
    obtaining current position of the electric vehicle, GPS obtains the current position of the vehicle;
    sensing, by a speed sensor, speed of the electric vehicle;
    sensing, by an accelerator pedal position sensor, an accelerator pedal position of the electric vehicle; and
    sensing, by an air temperature sensor, external air temperature of the electric vehicle, wherein
    sending a request signal to the electric vehicle when the electric vehicle is returned;
    when the electric vehicle receives the request signal, the electric vehicle sends response information including at least one of a history of change in accelerator position during the utilization of the electric vehicle, a history of change in speed of the electric vehicle, a history of change in external air temperature of the electric vehicle, and a history of the positional information of the electric vehicle;
    determining the deterioration utilization period when a period during which the accelerator pedal position of the electric vehicle becomes more than or equal to a threshold value, or a period during which an amount of change of the accelerator pedal position of the electric vehicle becomes more than or equal to a threshold value, or a period during which the speed of the electric vehicle becomes more than or equal to a threshold value, or a period during which an amount of change of the speed of the electric vehicle becomes more than or equal to a threshold value, or a period during which the external air temperature of the electric vehicle becomes more than or equal to a high-temperature threshold value, or a period during which the external air temperature of the electric vehicle becomes less than or equal to a low-temperature threshold value, or a period during which the electric vehicle is traveling on the up-hill road, or a period during which the current flowing in the battery becomes more than or equal to a threshold;

calculating, by a central processing unit (CPU) the deterioration utilization period based on the response information;

setting, using the utilization history, a dividing ratio for dividing, for each of the plurality of users, a profit obtained by renting the electric vehicle to a user who does not belong to the predetermined group; and setting, among the plurality of users, for a user for whom the deterioration utilization period is long, the dividing ratio to be lower than the dividing ratio set for a user for whom the deterioration utilization period is short.

4. An information processing system comprising:

an electric vehicle shared by a plurality of users, the plurality of users belonging to a predetermined group; and a server, wherein the server is configured to store (i) information for specifying the plurality of users and (ii) a utilization history of each of the plurality of users for the electric vehicle, the utilization history including a utilization period during which the electric vehicle is utilized and a deterioration utilization period in which a power storage device mounted in the electric vehicle is deteriorated;

a controller configured to
  detect current of a battery mounted in the electric vehicle; and
  obtain current position of the electric vehicle, GPS obtains the current position of the vehicle;

a speed sensor configured to sense speed of the electric vehicle;

an accelerator pedal position sensor configured to sense an accelerator pedal position of the electric vehicle; and an air temperature sensor configured to sense external air temperature of the electric vehicle, wherein a communication device sends a request signal to the electric vehicle when the electric vehicle is returned;

when the electric vehicle receives the request signal, the electric vehicle sends response information including at least one of a history of change in accelerator position during the utilization of the electric vehicle, a history of change in speed of the electric vehicle, a history of change in external air temperature of the electric vehicle, and a history of the positional information of the electric vehicle;

the deterioration utilization period is determined when a period during which the accelerator pedal position of the electric vehicle becomes more than or equal to a threshold value, or a period during which an amount of change of the accelerator pedal position of the electric vehicle becomes more than or equal to a threshold value, or a period during which the speed of the electric vehicle becomes more than or equal to a threshold value, or a period during which an amount of change of the speed of the electric vehicle becomes more than or equal to a threshold value, or a period during which the external air temperature of the electric vehicle becomes more than or equal to a high-temperature threshold value, or a period during which the external air temperature of the electric vehicle becomes less than or equal to a low-temperature threshold value, or a period during which the electric vehicle is traveling on the up-hill road, or a period during which the current flowing in the battery becomes more than or equal to a threshold; and the server is further configured to calculate the deterioration utilization period based on the response information; and set, using the utilization history, a dividing ratio for dividing, for each of the plurality of users, a profit obtained by renting the electric vehicle to a user who does not belong to the predetermined group; and among the plurality of users, the server is further configured to set, for a user for whom the deterioration utilization period is long, the dividing ratio to be lower than the dividing ratio set for a user for whom the deterioration utilization period is short.

* * * * *

UNITED STATES PATENT AND TRADEMARK OFFICE
CERTIFICATE OF CORRECTION

PATENT NO. : 11,580,594 B2
APPLICATION NO. : 16/209389
DATED : February 14, 2023
INVENTOR(S) : Hiroshi Igata et al.

It is certified that error appears in the above-identified patent and that said Letters Patent is hereby corrected as shown below:

On the Title Page

Add item (30) as follows:
Foreign Application Priority Data
December 6, 2017 (JP)................................2017-234415

Signed and Sealed this
Seventeenth Day of September, 2024

Katherine Kelly Vidal
*Director of the United States Patent and Trademark Office*